Feb. 27, 1934.   R. D. MERSHON   1,948,864
MAINTAINING VOLTAGE BALANCE IN ELECTROLYTIC CONDENSERS
Filed June 24, 1931    3 Sheets-Sheet 1

INVENTOR
Ralph D. Mershon
BY HIS ATTORNEYS
Cooper, Kerr and Dunham

Feb. 27, 1934.  R. D. MERSHON  1,948,864
MAINTAINING VOLTAGE BALANCE IN ELECTROLYTIC CONDENSERS
Filed June 24, 1931  3 Sheets-Sheet 2
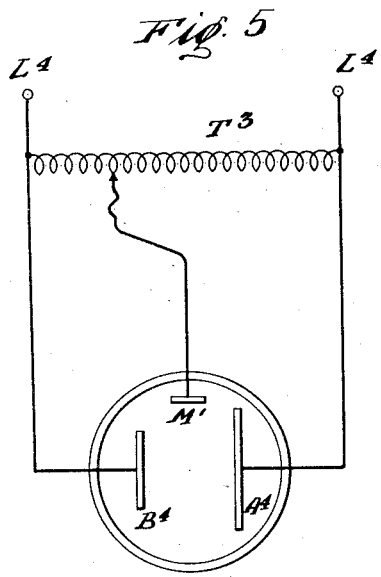
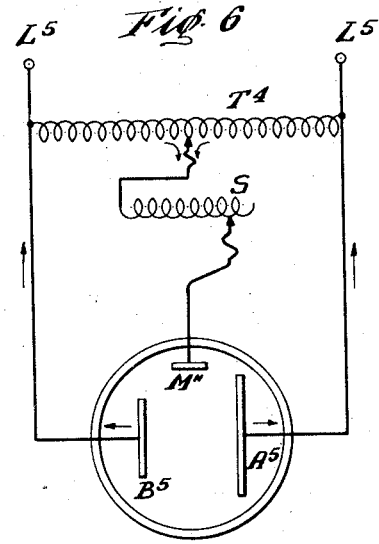
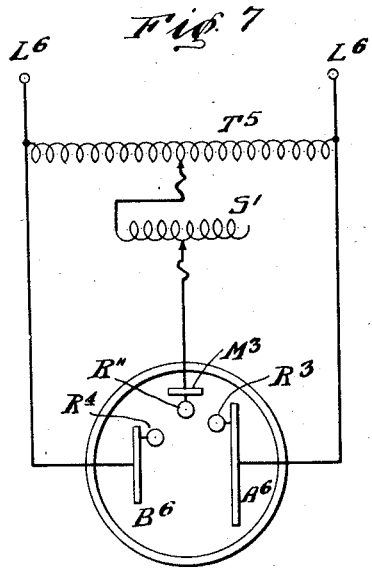
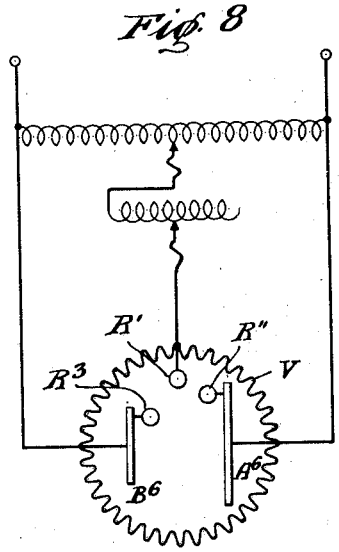
INVENTOR
*Ralph D. Mershon*
BY HIS ATTORNEYS
*Cooper, Kerr and Dunham*

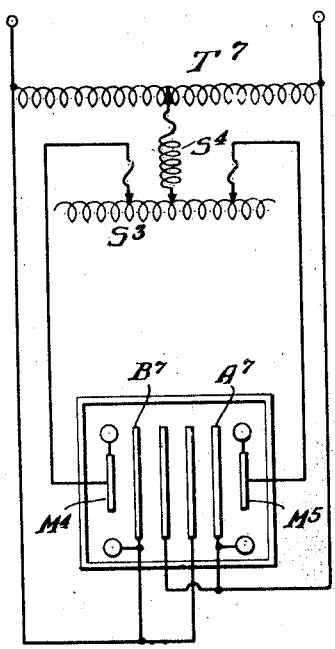
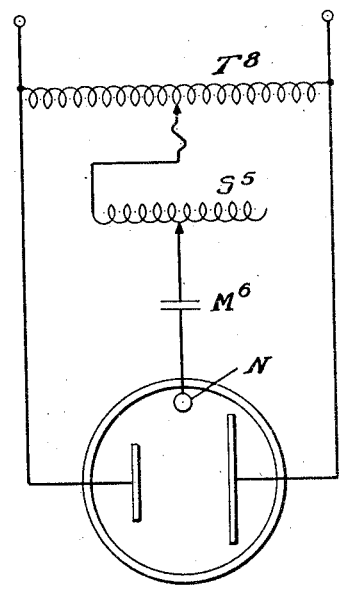

Patented Feb. 27, 1934

1,948,864

UNITED STATES PATENT OFFICE 1,948,864

MAINTAINING VOLTAGE BALANCE IN ELECTROLYTIC CONDENSERS

Ralph D. Mershon, New York, N. Y.

Application June 24, 1931. Serial No. 546,547

27 Claims. (Cl. 175—315)

This invention relates to electrolytic condensers, more particularly to means for equalizing between the condenser anodes or sets of anodes the alternating voltage which is impressed on the condenser when the same is in operation; and its nature and objects will be more readily understood by reference to the accompanying drawings, in which various embodiments are diagrammatically illustrated.

In the drawings,

Fig. 5 shows an embodiment in which the auxiliary anode may be connected to the mid-point of the impressed voltage or on either side thereof.

Fig. 6 shows an embodiment in which the auxiliary anode is connected to the mid-point of the impressed voltage, or on either side thereof, through a suitable reactance by which the capacity of the auxiliary anode can be neutralized.

Fig. 7 shows an embodiment like Fig. 6 but in an excited condenser.

Fig. 8 is like Fig. 7 except that the vessel or tank containing the electrolyte is made of filming metal and serves as the auxiliary anode.

Fig. 9 shows an embodiment (similar to Fig. 7) in which the auxiliary anode is in two halves or parts, one at each end of the main anode assembly.

Fig. 10 illustrates an embodiment in which the auxiliary capacity is separate from the main condenser and is of a non-electrolytic type.

In an electrolytic condenser having two anodes, one anode is connected to one terminal or side of the circuit with which the condenser is used, and the other anode is connected to the other side or terminal. When the condenser has more than two anodes the latter are connected in groups, one to one side or terminal and the other group to the other side or terminal of the circuit. In each case the condenser may be said to consist of two condensers in series: one composed of one anode or group of anodes, the anode film or films thereon, and the electrolyte; the other composed of the other anode or anode-group, the film or films thereon, and the electrolyte. Such a condenser operates by virtue of a negative charge on or in the electrolyte. This charge is necessary also for the preservation of the films, and in an "unexcited" condenser it is the result of the asymmetrical properties of the films themselves, whereby the filmed anodes also act as rectifying electrodes to produce and maintain the negative charge. In such a condenser the magnitude of this charge is not, in general, sufficient to entirely protect the films from the effect of film-stress reversal and as a result of such insufficiency the films deteriorate. In what follows an "unexcited" condenser means one in which the anodes act also as rectifying electrodes, to institute and maintain, or at least to maintain, in part if not entirely, the negative charge necessary for the operation of the condenser; and an "excited" condenser means one in which the negative charge is instituted and maintained, or at least is maintained, in part if not entirely, by impressing unidirectional voltage on the condenser anodes from a source external to the condenser or from suitable rectifying means, namely one or more rectifying electrodes, in the same electrolyte as the condenser, as described in my copending application Serial No. 317,610, now Patent No. 1,889,415, patented November 29, 1932, which electrode or electrodes may be subjected to the same voltage as that to which the anodes are subjected, or to a higher voltage.

Figure 1:
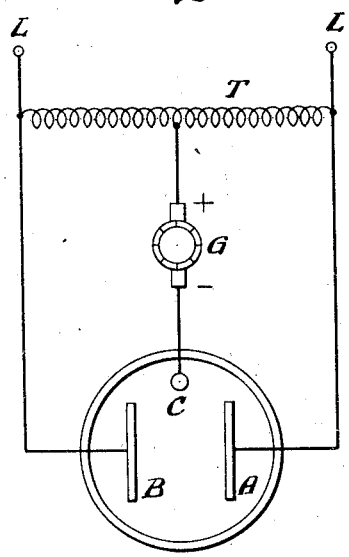
Fig. 1 shows an excited condenser, in which the excitation voltage and current are supplied by a direct current generator connected to the electrolyte by means of a non-filming cathode and to the anodes by any suitable reactance, in the present instance a choke coil, which will prevent short-circuiting any part of the condenser when alternating voltage and current are impressed thereon.
Figure 2:
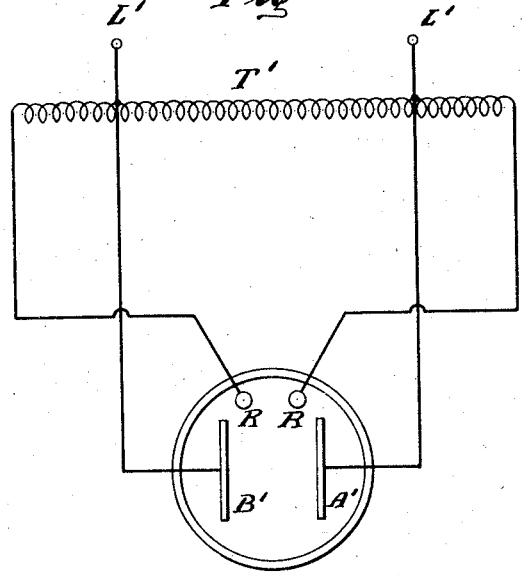
Fig. 2 shows an excited condenser in which the exciting voltage is supplied by rectifying electrodes on which a higher alternating voltage is impressed than on the anodes.

Considering the condenser as composed of two condensers in series, the two are usually out of balance. That is, one is usually of greater capacity than the other, and this is true even when great care is taken to have the two exactly the same as to extent of surface, quality of metal, quality of film, and other factors which affect the capacity of an electrolytic condenser. In an excited condenser in which the exciting source is a generator or battery this unbalance gives no trouble, for the source of the exciting voltage will pass alternating current without allowing the negative charge to leak away, and hence the middle point of the impressed voltage is, so far as alternating current is concerned, in practically free connection with the point electrically midway between the two condensers. This insures that there is impressed upon each condenser its appropriate part (i. e., its half) of the impressed voltage. In Fig. 1 a condenser excited by a D. C. generator is illustrated, in which A, B, are the anodes, T the conventional balance coil or autotransformer, G the exciting generator, having its positive terminal connected to the middle or neutral point of the balance coil, and C the cathode by which connection is made between the electrolyte and the negative terminal of the generator. To a certain extent the favorable condition described is approximated in the case of a condenser excited by electrolytic rectifying means on which is impressed a voltage higher than that on the anode; as in Fig. 2, for example, in which there are more ampere turns of the autotransformer T' between the rectifying electrodes R, R, than between the anodes A', B'. Moreover, since the voltage on the rectifying electrode will always be higher than that on the associated anode there will be no chance for reversal of film stress even on the anode which may be taking the larger share of the condenser voltage. Hence the corrosion mentioned later herein will not occur. Also, the higher exciting voltage increases the film stress and works the film at a higher point on the film formation curve, which makes for stability by limiting the cumulative action referred to below.

But in an unexcited condenser there is no such stabilizing action. In such condensers the anode of lesser capacity takes more of the impressed voltage than the other and the higher voltage builds up the film to greater thickness, which means further decrease of capacity and further increase of voltage on the one electrode. In other words, the action is cumulative; and it is finally limited by the fact that the film is moving up on the film formation curve and may eventually reach the point beyond which substantially no further thickening occurs. This action means that the anode taking the higher voltage will try to produce a higher negative charge in its effort to keep down to as low a value as possible the reverse voltage acting upon the anode film, and this in turn means that the anode taking the higher voltage will do most of the rectifying and that it will be corroded far more rapidly than it would be if the rectifying action were evenly divided,—that is, than it would be if the impressed voltage were evenly divided. Hence an unexcited condenser which is unbalanced will have a shorter life and will show more corrosion on one anode than on the other. Experience bears this out.

Figure 3:
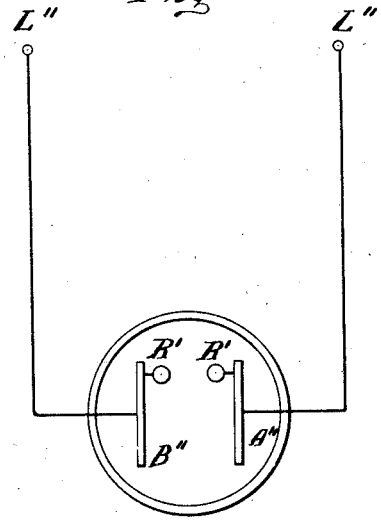
Fig. 3 shows an excited condenser in which the rectifying electrodes (to supply the exciting voltage) are connected directly to the anodes.

In Fig. 3 the rectifying electrodes R', R', which supply the exciting current, are attached to or otherwise directly connected with the anodes A'', B'', and the voltages on the electrode and its associated anode are equal. That is, the voltage on anode A'', for example, is the same as the rectifying electrode which is connected to it. In such case the effect of unbalance will be similar to that described above, but in general it will be less drastic since the brunt of the rectifying operation, and, consequently, of the corrosion, will fall upon the rectifying electrode connected with the anode which is taking the larger share of the impressed voltage. Usually, therefore, such a condenser will have a longer life than an unexcited condenser.

I have, however, devised a simple and convenient means whereby equal partition of the impressed voltage on the two anodes or sets of anodes can be closely approximated, and in the annexed drawings I have illustrated several advantageous forms of the invention, which will be described first as embodied in an unexcited condenser.

Figure 4:
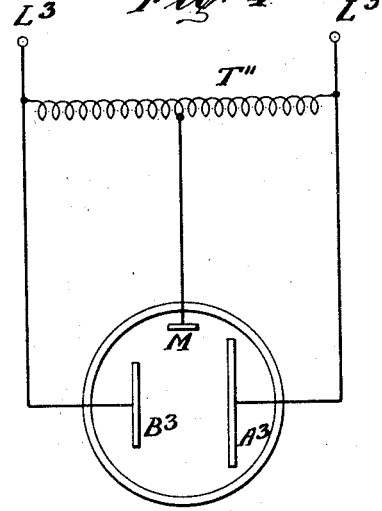
Fig. 4 shows a simple embodiment of the present invention in an unexcited condenser, using an auxiliary anode connected to the mid-point of the impressed alternating voltage.

As implied above, the two voltages can not be balanced, that is, the impressed voltage can not be equally divided between the two anodes or sets of anodes, by merely connecting the electrolyte to the mid-point of the impressed voltage because if that were done the negative charge would immediately disappear and the two condensers in series that make up the complete condenser would, each of them, be practically short-circuited at alternate half cycles. I can, however, make the connection by means of an auxiliary anode or condenser electrode, that is, a filmed electrode, and this method is illustrated in Fig. 4, in which the auxiliary electrode is indicated at M. In this figure one of the anodes, as $A^3$, is shown larger than the other, $B^3$, to indicate that it has the larger capacity. Having the larger capacity it would, in the absence of M, take the smaller part of the voltage impressed on the terminals $L^3$, $L^3$, but although the voltage between $A^3$ and the electrolyte is less than half, the voltage between $A^3$ and M is equal to one half; and accordingly, in addition to the current that would flow between $A^3$ and $B^3$ if M were not present, there will flow a current between $A^3$ and M. That is, there will be more condenser current passing by way of $A^3$ than by way of $B^3$. Hence, due to the presence of M, the voltage between $A^3$ and the electrolyte will be raised and that between $B^3$ and the electrolyte will be lowered, and by making the capacity of M large the two parts of the voltages may be as nearly equal as desired.

The use of a large capacity in the auxiliary anode can be obviated by the simple expedient of a variable connection between the same and the balance coil, as indicated in Fig. 5, so that the connection can be moved over on the coil $T^3$ to a point which will throw a higher voltage between $A^4$ and M', shifting the point of connection until the condenser current through $A^4$ is large enough (relative to the current through $B^4$) to cause the voltage between $A^4$ and the electrolyte to be the same in value as that between $B^4$ and the electrolyte.

A better method, however, is illustrated in Fig. 6. In this construction the auxiliary anode M'' is connected to the mid-point of the voltage impressed on the terminals $L^5$, $L^5$, but the connection is made through a series inductive reactance S. This reactance raises the alternating voltage on M'',—when there is any to raise, i. e., when the voltages on $A^5$ and $B^5$ are unequal. If the value of this reactance is adjusted until the reactances of S and M'' are equal,—in other words, until resonance is approached as nearly as possible,—the increase of voltage on M'' will be a maximum. We shall then have the condition of the electrolyte being connected to the mid-point of the impressed voltage by a connection whose only obstruction to the flow of current is practically its ohmic resistance (which can be kept low), but which will not allow the negative charge to flow away. If such an adjustment of the reactance S subjects the auxiliary anode M'' to excessively high voltage the value of S can be adjusted to either side of such point.

The arrows in Fig. 6 show the direction in which the positive charge (which exists on one or both anodes when the condenser is in operation) tries to flow through the balance coil and get to the negative charge in the electrolyte. Such flow is prevented by the film on the auxiliary electrode M", except for relatively slight leakage through the film, and this tendency for current to flow from M" to the electrolyte maintains the film on M" whether alternating current flows through M" or not. Other conditions being the same, the higher the voltage of formation to which a film is carried the thicker the film. This relation is not strictly linear, however, since, as appears in my copending application Serial No. 335,379, filed November 3, 1919, now Patent No. 1,814,174, granted July 14, 1931, the film-formation curve is not a straight line. Also, thickness of the film and the capacity of the anode bear an inverse relation to each other. Hence, approximately, the thinner the film the greater the capacity, and vice versa; and on this basis the film on M" when the impressed voltage on the condenser terminals is equally divided between the anodes is one half the thickness of the films on $A^5$ and $B^5$, but if the voltage is not equally divided the thickness of the film on M" will be one half that of the film on the anode taking the higher voltage. The same is true of all the condensers herein described in which an auxiliary electrode is used such as M, M', M", etc.

In the condenser shown in Fig. 7, rectifying electrodes R", $R^3$, $R^4$ are provided for the main anodes $A^6$, $B^6$, and the auxiliary anode $M^3$, to excite the condenser and protect the films against reversal of film stress. A certain amount of stabilizing effect can be realized with the auxiliary anode $M^3$ omitted (retaining R") but the use of both is preferred.

In Fig. 8 the tank V, containing the electrolyte, is the auxiliary anode, and for that purpose it is made of filming metal. As indicated the vessel may be shaped, as by corrugating it, to increase its condenser surface. This feature also increases the heat-radiating surface of the condenser, which in some cases is advantageous.

In any of the condensers shown in the preceding Figs. 4 to 7 inclusive, the auxiliary electrode may be made in two parts, one at each end of the row of condenser anodes, with the two parts connected together. In Fig. 9 this feature is illustrated as embodied in an apparatus of the type shown in Fig. 6. In Fig. 9 the two parts of the auxiliary or balancing anode, designated $M^4$, $M^5$, are connected to each other through reactance $S^3$ and through the latter to the balance coil $T^7$ by reactance $S^4$. If the value of the reactance $S^3$ is such as to just neutralize the capacities of two halves $M^4$, $M^5$ of the auxiliary anode, the two will act as though there were no resistance to flow of current between them (other than the effective resistance due to losses), and they also can easily pass the current between the outer surfaces of the condenser anodes $A^7$, $B^7$, which would otherwise flow through the electrolyte between $A^7$ and $B^7$. The adjustment need not, however, be made for complete resonance but may be on either side of that value.

It may be desirable in some cases to form the film to a greater thickness than that corresponding to the voltage of the negative charge in the electrolyte, that is, to a greater thickness than one-half that of the film on the main anode taking the greater share of the main voltage; as for example the case in which the reactance in series with the auxiliary anode if adjusted to approximate resonance therewith.

The auxiliary capacity need not be in the same electrolyte as the main condenser but may be entirely separate. Nor does it have to be of the electrolytic type but may be a "dry" condenser or "oil" condenser or any type well known in the condenser art. Such an apparatus is illustrated in Fig. 10, in which $M^6$ is the auxiliary capacity connected to the electrolyte by a non-filming electrode N and to the choke coil $T^8$ through the variable reactance $S^5$. A non-electrolytic condenser may be used as the auxiliary capacity when it is desirable to have on the auxiliary capacity a higher voltage than could be safely impressed on one electrolytic condenser. In the figure the higher voltage is obtained by means of the series reactance $S^5$.

An important advantage of the invention is found in the fact that the balancing action of the auxiliary capacity is automatic when the capacity is connected to the effective mid-point of the impressed voltage. It does not function if there is no unbalance. And it does function no matter which way the unbalance occurs; so that if the condenser should undergo some change whereby the main anode which had the higher capacity came to have the lower, the auxiliary capacity and its inductive reactance would have the same balancing effect as it had when the unbalance was the other way.

The invention provides a simple and effective way of equalizing the impressed voltage between the condenser anodes or sets of anodes, thereby substantially obviating unbalanced capacities and the harmful effects thereof. The invention is useful with excited condensers, especially when the excitation voltage is low, and it is particularly advantageous with unexcited condensers, the life of which it greatly prolongs.

It is to be understood that the invention is not limited to the specific devices herein illustrated and described but can be embodied in other forms without departure from its spirit.

I claim—

1. In an electrolytic condenser, the combination of filmed main anodes, auxiliary capacity electrically connected with the electrolyte, and a conductive non-short-circuiting connection between the auxiliary capacity and said main anodes.

2. An apparatus as described in claim 1, in which the connection of the auxiliary capacity to the main anodes is made through series inductive reactance.

3. In an electrolytic condenser, the combination with filmed main anodes, of an auxiliary filmed anode in the electrolyte, and a conductive non-short-circuiting connection between the said auxiliary anode and the main anodes.

4. In an electrolytic condenser, the combination with filmed main anodes, of an auxiliary filmed anode in the electrolyte, and conducting means, including inductive reactance, connecting the auxiliary anode and said main anodes.

5. In an electrolytic condenser, the combination with filmed main anodes, and inductive reactance across the same, of an auxiliary filmed anode in the electrolyte and connected to said reactance at a point adapted to produce a desired division of alternating voltage between said main anodes when such voltage is impressed thereon.

6. In an electrolytic condenser, the combination with filmed main anodes, and inductive reactance across said main anodes, of an auxiliary filmed anode in the electrolyte and adjustably connected to said reactance to vary the division of alternating voltage between said main anodes when such voltage is impressed thereon.

7. In an electrolytic condenser, the combination with filmed main anodes, and main inductive reactance across the same, of an auxiliary filmed anode, and auxiliary inductive reactance between the auxiliary anode and the main reactance.

8. An apparatus as described in claim 7, in which the auxiliary reactance is adjustably connected to the main reactance.

9. An apparatus as described in claim 7, in which the auxiliary reactance is variable.

10. An apparatus as described in claim 7, in which the auxiliary reactance is variable and is adjustably connected to the main reactance.

11. An apparatus as described in claim 1, in combination with electrolytic rectifying condenser-exciting means in the electrolyte.

12. An apparatus as described in claim 4, in combination with electrolytic rectifying condenser-exciting means in the electrolyte.

13. An apparatus as described in claim 6, in combination with electrolytic rectifying condenser-exciting means in the electrolyte.

14. An apparatus as described in claim 7, in combination with electrolyte rectifying condenser-exciting means in the electrolyte.

15. In an electrolytic condenser, the combination with filmed main anodes and main inductive reactance across the same, of auxiliary inductive reactance adjustably connected to the main reactance, an auxiliary filmed anode in the electrolyte and connected to the auxiliary reactance, and electrolytic rectifying condenser-exciting means in the electrolyte.

16. An apparatus as described in claim 15, in which the auxiliary reactance is variable.

17. An apparatus as described in claim 1, in combination with rectifying electrodes immersed in the electrolyte and connected with the main anodes to excite the condenser.

18. An apparatus as described in claim 15, in which the condenser-exciting means comprises rectifying electrodes connected to the main anodes.

19. In an electrolytic condenser, the combination with filmed main anodes and main inductive reactance across the same, of variable auxiliary inductive reactance adjustably connected to the main reactance, and rectifying electrodes in the electrolyte and connected to the main anodes to excite the condenser.

20. An apparatus as described in claim 19, in which there is also in the electrolyte a rectifying electrode connected to the auxiliary anode.

21. An apparatus as described in claim 7, in which the auxiliary anode is in two parts arranged at the ends of the main anode assembly.

22. In an electrolytic condenser, the combination with filmed main anodes and inductive reactance across the same, of inductive reactance adjustably connected to the main reactance, a two-part auxiliary filmed anode in the electrolyte, having its parts arranged at the ends of the main anode assembly and connected to the auxiliary reactance, rectifying electrodes immersed in the electrolyte and connected to the main anodes, and rectifying electrodes connected to the two parts of the auxiliary anode.

23. An apparatus as described in claim 22, in which the two parts of the auxiliary anode are connected to the auxiliary reactance through a variable inductive reactance.

24. An electrolytic condenser comprising, in combination, two anodes or groups of anodes, one of which is adapted to be connected to each side of an alternating current circuit, and means for dividing the alternating current voltage impressed upon said condenser substantially equally between said anodes or anode-groups and automatically balancing the capacity of the two anodes or anode-groups of the condenser to maintain the same of substantially equal capacity, said automatic balancing means including auxiliary capacity connected between the electrolyte of the main condenser and the effective mid-point of the source of impressed alternating current voltage and in non-short-circuiting relation with the main electrodes of the condenser.

25. An electrolytic condenser comprising, in combination, two anodes or groups of anodes, one of which is adapted to be connected to each side of an alternating current circuit, and means for dividing the alternating current voltage impressed upon said condenser substantially equally between said anodes or anode-groups and automatically balancing the capacity of the two anodes or anode-groups of the condenser to maintain the same of substantially equal capacity, said automatic balancing means including auxiliary capacity connected between the electrolyte of the main condenser and the effective mid-point of the source of impressed alternating current voltage and in non-short-circuiting relation with the main electrodes of the condenser, and means for resonating said auxiliary capacity to reduce the total reactance of the circuit including the same.

26. An electrolytic condenser comprising, in combination, two anodes or groups of anodes, one of which is adapted to be connected to each side of an alternating current circuit, and means for dividing the alternating current voltage impressed upon said condenser substantially equally between said anodes or anode-groups and automatically balancing the capacity of the two anodes or anode-groups of the condenser to maintain the same of substantially equal capacity, said automatic balancing means including auxiliary capacity connected between the electrolyte of the main condenser and the effective mid-point of the source of impressed alternating current voltage and in non-short-circuiting relation with the main electrodes of the condenser, said auxiliary capacity being constituted by an auxiliary filmed condenser electrode immersed in the electrolyte of the main condenser.

27. An electrolytic condenser comprising, in combination, two anodes or groups of anodes, one of which is adapted to be connected to each side of an alternating current circuit, and means for dividing the alternating current voltage impressed upon said condenser substantially equally between said anodes or anode-groups and automatically balancing the capacity of the two anodes or anode-groups of the condenser to maintain the same of substantially equal capacity, said automatic balancing means including auxiliary capacity connected between the electrolyte of the main condenser and the effective mid-point of the source of impressed alternating current voltage and in non-short-circuiting relation with the main electrodes of the condenser, said auxiliary capacity being constituted by an auxiliary filmed condenser electrode immersed in the electrolyte of the main condenser, and rectifying electrodes associated with the main condenser electrodes and with the auxiliary electrode to excite the condenser and protect the films against reversal of film stress.

RALPH D. MERSHON.